Oct. 24, 1944.  E. PICK  2,361,235

TURBIDITY DETECTOR

Filed Jan. 17, 1942

INVENTOR

Erin Pick

Patented Oct. 24, 1944

2,361,235

UNITED STATES PATENT OFFICE 2,361,235

TURBIDITY DETECTOR

Eric Pick, East Rockaway, N. Y., assignor to The Permutit Company, New York, N. Y., a corporation of Delaware Application January 17, 1942, Serial No. 427,091

2 Claims. (Cl. 88—14)

This invention relates to turbidity detectors; and it comprises a vessel, a fluid inlet and a fluid outlet for said vessel, transparent opposite sides for said vessel, a light sensitive cell adjacent one of said transparent sides, a light source projecting a beam of light through said transparent sides toward said cell, and enclosure means separating air adjacent the outside surfaces of said transparent sides from the atmosphere surrounding the turbidity detector and advantageously containing desiccating material, said vessel preferably having an open top with a removable cover through which the inside surfaces of said transparent sides are accessible for cleaning purposes, and said outlet being advantageously adapted to maintain in said vessel a liquid level above said beam of light; all as more fully described hereinafter and as claimed.

In many arts and processes it is desirable to determine the turbidity of fluids. In the treatment of water in accordance with the process disclosed in the patent to Spaulding No. 2,021,672 dated November 19, 1935, for instance, the treated water normally has a relatively low turbidity of the order of 5 to 10 parts per million. When the process is not functioning properly the turbidity of the treated water rises so that a continuous determination of the turbidity of the treated water is an excellent check on the performance.

Another use for turbidity determinations in the field of water treatment exists in connection with the softening of water by passage through a bed of granular cation exchange material. Such material has a given hardness removal capacity, and when that capacity has been reached the water leaving the bed contains some hardness, indicating that the cation exchange material requires regeneration. If a water sample is mixed with a suitable reagent, such as soap solution, any hardness present in the water reacts with the soap to form a precipitate which produces cloudiness or turbidity of a degree depending on the amount of hardness forming constituents present in the water sample. Thus, determination of the turbidity of a mixture of soap and a sample of water taken from the effluent of a cation exchange softener furnishes an indication when the exchange material should be regenerated.

There are many other fields in which the determination of turbidity makes for greater efficiency and more satisfactory performance, and various devices involving the use of light sensitive cells for the determination of turbidity have been suggested. There is room for improvement, however, in the reliability of such devices and in the amount of attention required to maintain them in operation. For instance, when the liquid to be tested is cold and the surrounding atmosphere is relatively warm and humid the vessel holding a sample of the liquid will sweat, i. e. small droplets of water will condense on its outside walls. These droplets intercept or disperse some light from a beam directed through them, and their presence thus causes an error in the turbidity determination. Furthermore, turbidity present in a liquid sample always has more or less tendency to settle out and cling to the walls of a container holding such liquid. Such matter deposited on transparent walls through which a light beam passes on its way to the light sensitive cell absorbs some light and therefore likewise causes an error in the turbidity determination. Prior art turbidity detectors have not been constructed in such fashion that the deposition of turbidity on the transparent walls is minimized, and that these walls can periodically be cleaned with ease and convenience.

It is an object of my invention to prevent the sweating of the outside surfaces of transparent walls through which a beam of light passes on its way to the light sensitive cell of a turbidity detector.

Another object is to arrange said transparent walls in such manner that a minimum of solid matter is deposited upon them by the liquid being tested.

A third object of my invention is to make it easy and convenient to clean said transparent walls periodically so as to remove deposits therefrom with a minimum of interference with continuous operation of the turbidity detector.

The manner in which these objects are achieved is illustrated in the appended drawing in which—

Like numerals refer to like parts throughout the several views.

Figure 1:
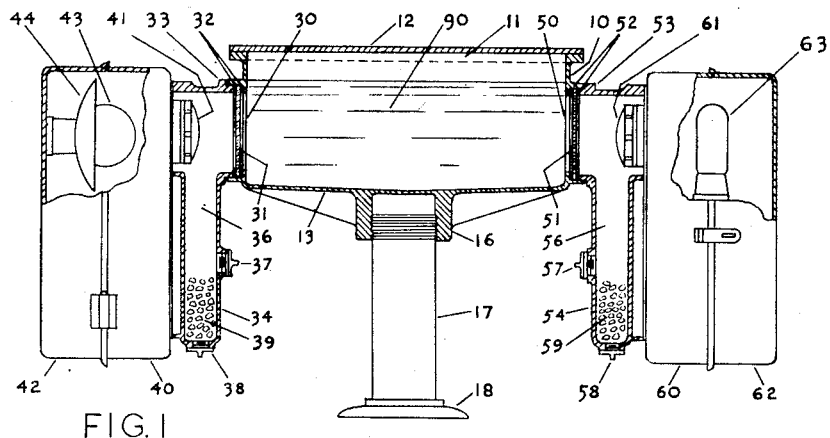
Fig. 1 is an elevation, partly in section along line 1—1 of Fig. 2, of an apparatus incorporating the features of my invention.
Figure 2:
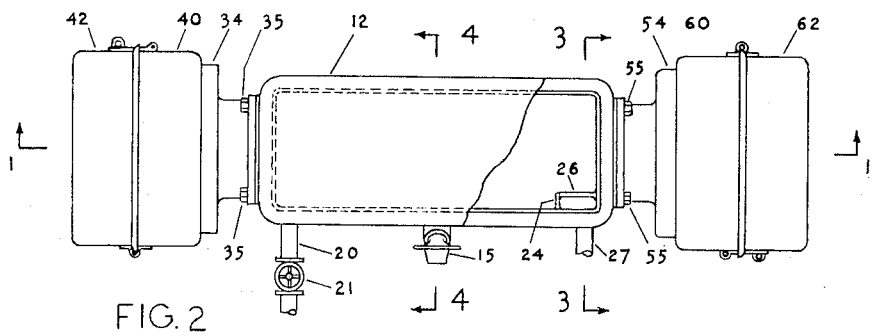
Fig. 2 is a plan view of the apparatus shown in Fig. 1, with the cover partly broken away.

The turbidity detector comprises a vessel 10 with an open top, as shown at 11, closed by a readily removable cover 12. The bottom 13 of vessel 10 slopes from both ends toward a central depression 14 with which a drain valve 15 is in communication. Into a boss 16 on the bottom 13 is screwed a pipe 17 with a flange 18 forming a support for the entire apparatus.

At one end vessel 10 has an inlet pipe 20 provided with an inlet valve 21 which is advantageously of the needle type. At its other end vessel 10 has a wall structure 24 defining, with the outside walls of the container, an outlet compartment 25, the upper edge of wall structure 24 constituting a weir 26 over which liquid within vessel 10 may discharge into the outlet compartment 25 and thence via a discharge pipe 27 to a point of disposal. A compartment similar to outlet compartment 25 may be formed adjacent to the point where inlet pipe 20 is connected with vessel 10 by a wall structure 22 (Fig. 4), but this latter wall structure may be omitted so that pipe 20 then communicates directly with the inside of vessel 10.

In a recessed opening 30 on one side of vessel 10 is mounted a window 31 made of plate glass or the like and held tightly between gaskets 32 by a flange 33 on a bracket 34 which is secured to vessel 10 by means of bolts 35. Within bracket 34 is a completely closed chamber 36 which is provided with a filling plug 37 and a drain plug 38 by means of which a supply of hygroscopic desiccating material 39, such as granular calcium chloride or silica gel may be introduced into or removed from chamber 36, respectively. A housing 40 is attached to bracket 34 by means of screws (not shown) inserted through the inside of the housing.

A lens 41 mounted on the housing 40 is located in chamber 36 directly opposite the window 31. The housing 40 has a hinged cover 42 and within it is a light bulb 43 with a reflector 44 adapted to project a beam of light through lens 41.

In another recess 50 on the other side of vessel 10 is a window 51 held in place between gaskets 52 by a flange 53 on a bracket 54 secured to vessel 10 by bolts 55. Within bracket 54 is a chamber 56 containing a supply of desiccating material 59 and provided with a filling plug 57 and a drain plug 58. Attached to bracket 54 is a housing 60 with a hinged cover 62. A lens 61 on housing 60 is arranged to collect light shining through window 51 and concentrate it upon a light sensitive cell 63 mounted within housing 60.

Figure 5:
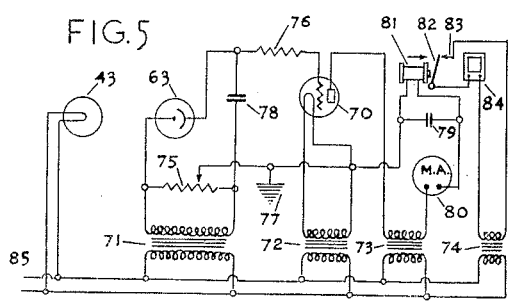
Fig. 5 is a wiring diagram showing a suitable arrangement of electrical devices for the apparatus illustrated in Figs. 1 to 4.

Fig. 5 shows a suitable arrangement of electric devices but it is to be understood that this particular arrangement forms no part of my invention, and that other modified systems may be substituted therefor. As shown, the system includes, besides the light bulb 43 and the light sensitive cell 63 previously referred to, a triode amplifying tube 70, transformers 71, 72, 73 and 74, an adjustable resistance 75, a fixed resistance 76, a ground 77, condensers 78 and 79, a milliammeter 80, a relay 81 with a movable member 82 and a contact point 83, and a buzzer 84. All these devices with the exception of light bulb 43 and, perhaps, buzzer 84 and transformer 74 are best mounted within housing 60. The system is supplied with electric current, as illustrated at 85, from a source of alternating current (not shown).

Operation of the apparatus is as follows. A continuous sample of the liquid to be tested is admitted to vessel 10 through inlet pipe 20, the rate being determined by the adjustment of valve 21. The liquid fills the vessel 10, as shown at 90, up to a level determined by the elevation of weir 26 which is above the top of the light beam projected from bulb 43 through lens 41, window 31, the liquid 90, window 51 and lens 61 upon the light sensitive cell 63. As further liquid is supplied to vessel 10 it overflows weir 26 into outlet compartment 25 whence it passes via discharge pipe 27 to a suitable place of disposal.

When the liquid 90 within vessel 10 is free of turbidity the light reaches cell 63 with maximum intensity. The cell then generates a relatively strong electric current which is amplified by the action of the triode 70 so that the current flowing through the circuit comprising the plate of the triode 70, the secondary of the transformer 73, the milliammeter 80, the relay 81, and the filament of the triode 70 is of sufficient strength to energize the relay 81 so as to lift the movable member 82 from contact point 83, thereby breaking the circuit to buzzer 84. The deflection of the milliammeter is at a maximum, and the point indicated on its scale under these conditions may conveniently be marked zero turbidity.

If any turbidity appears now in the liquid 90 admitted to vessel 10 the intensity of light reaching cell 63 diminishes, and the strength of the electric current generated by cell 63 and amplified by the triode 70 is reduced accordingly. The milliammeter indicates the amount of turbidity present in the liquid by a reduced deflection of its indicating element. The relay 81, arranged for marginal operation, releases the movable member 82 to make contact with contact point 83 as soon as the amplified plate current has dropped to a predetermined value corresponding to a predetermined amount of turbidity in liquid 90; this establishes a circuit through buzzer 84 which thus calls attention to the fact that the turbidity of the liquid being tested has risen to a predetermined value.

The adjustable resistance 75 is used to adjust the degree of turbidity at which relay 81 closes the circuit controlled by its movable member 82.

Figure 3:
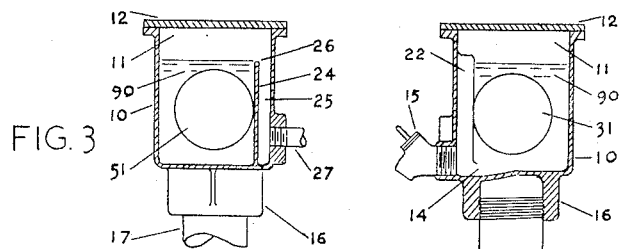
Fig. 3 is an elevation, in section along line 3—3 of Fig. 2.

As the apparatus continues to function solid matter gradually settles from the liquid 90 onto the bottom 13 of vessel 10. As may be observed in Figs. 1, 3 and 4 a considerable amount of sludge may thus be collected before it accumulates to such an extent as to intercept some of the light passing through the vessel. This accumulated sludge may conveniently be removed from time to time by opening drain valve 15.

The windows 31 and 51 are vertical and a minimum amount of deposit is, therefore, formed on them. Whatever solid matter is deposited on the windows, however, may readily be cleaned off by removing the cover 12 and inserting a suitable cleaning instrument through the open top 11 of vessel 10.

The outsides of windows 31 and 51 face the closed chambers 36 and 56 in which the air is maintained practically dry by the desiccating material contained in their lower portions. Therefore, no sweating of the windows with resultant errors in the turbidity determination will occur even if the liquid in vessel 10 is relatively cold and the air surrounding the apparatus is relatively warm and humid. Since the volume of air in chambers 36 and 56 is comparatively small and a certain amount of heat is released by the electrical devices in the housings 40 and 60 sweating will be prevented by the construction shown in many cases even if no desiccating material is placed in the chambers.

Figure 4:
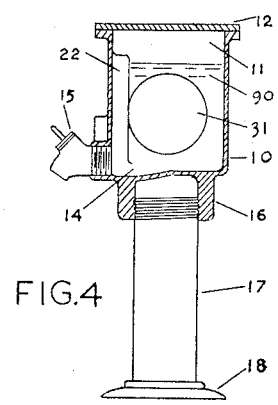
Fig. 4 is an elevation, partly in section along line 4—4 of Fig. 2.

The introduction of liquid into vessel 10 near the liquid level, as for instance by the use of the wall structure 22 shown in Fig. 4 is desirable when the liquid contains gas bubbles. These bubbles then escape from the liquid without having any opportunity of passing through the light beam and thereby causing an error in the turbidity determination.

Instead of the buzzer 84 a light or other signaling device may be used. The circuit controlled by relay 81 may include devices for automatically correcting a condition resulting in an abnormal turbidity of the liquid being tested. Other modifications may be made without departing from the spirit of my invention, and reference is, therefore, made to the appended claims for a definition of the scope of my invention.

What I claim is:

1. A turbidity detector comprising a vessel, transparent windows in opposite vertical sides of said vessel, an inlet for liquid adjacent one of said windows, an outlet for liquid adjacent the other of said windows, an enclosure for a volume of air contacting one of said windows, a casing mounted adjacent said enclosure, a light source in said casing and projecting a beam of light through said air and said one window into said vessel, a second enclosure for another volume of air contacting the other of said windows, a second casing mounted adjacent said second enclosure, and a light sensitive cell in said second casing and receiving light shining through said other window and said other volume of air, said enclosures extending to a level substantially below said beam of light, desiccating material in each of said enclosures, drain openings near the lowermost points of said enclosures, filling openings in each of said enclosures at a substantial distance above said drain openings, and removable covers for each of said openings.

2. A turbidity detector comprising a vessel open at the top, cover means for said open top, transparent windows in opposite vertical sides of said vessel, the surfaces of said windows facing the inside of said vessel being accessible through said open top, an enclosure for a volume of air contacting the surface of one of said windows facing the outside of said vessel, a casing mounted adjacent said enclosure, a light source in said casing and projecting a beam of light through said air and said one window into said vessel, a second enclosure for another volume of air contacting the surface of the other of said windows facing the outside of said vessel, a second casing mounted adjacent said second enclosure, a light sensitive cell in said second casing and receiving light shining through said other window and said other volume of air, said enclosures extending at right angles beyond said beam of light, desiccating material placed in said enclosures so as not to obstruct said beam of light, and means for inserting and removing said desiccating material, a liquid inlet at one end of said vessel, and an overflow outlet discharging liquid from an end of said vessel opposite said one end and maintaining in said vessel a liquid level above said beam of light.

ERIC PICK.